United States Patent Office

3,716,504
Patented Feb. 13, 1973

3,716,504
PAPER COATING COMPOSITIONS AND
PRODUCTS FORMED THEREFROM
Martin K. Lindemann, Somerville, and Rocco P. Volpe,
Newark, N.J., assignors to Air Products and Chemicals,
Inc., Allentown, Pa.
No Drawing. Filed Mar. 31, 1965, Ser. No. 444,388
Int. Cl. C08f *45/24;* D21h *3/44*
U.S. Cl. 260—8                                                   15 Claims

ABSTRACT OF THE DISCLOSURE

A coating composition effective to deposit upon a fibrous web, such as paper or paperboard, a glossy, bright coating having desirable "pick" characteristics comprises an aqueous synthetic polymer latex and a mineral filler, the latex containing dispersed vinyl acetate-ethylene copolymer of 5 to 40%, preferably more than 15%, ethylene content, and characterized by an intrinsic viscosity of 1 to 2.5 deciliters per gram as measured in benzene at 30° C., the dispersed copolymer having a particle size of $0.1\mu$ to $0.25\mu$, the latex preferably having a solids content of 35 to 70% of copolymer and 100 parts of filler preferably being present per 5 to 25 parts of latex solids.

---

The invention relates to coated cellulosic webs and to coating composition useful in the production of the coated webs.

In the preparation of a coated cellulosic web, e.g. a paper web there is used a pigment, such as clay or the like, sometimes with other materials such as, for example, a soluble pyrophosphate which may act as a dispersing and stabilizing agent. This mixture, commonly termed a pigment "slip" or, since it usually contains clay, a clay "slip," is then compounded with a binder or adhesive material to produce a composition known in the art as a coating "color," which is useful for coating a cellulose web, e.g. a paper or paperboard web. Substantial quantities of the binder are used, and, accordingly, the composition and characteristics of the binder are of great importance in determining the qualities of the finished coated web. It is important that the binder impart to the coating color or to the finished coated web a high degree of brightness, smoothness and gloss, and a good finish and feel after calendering. In addition to these basic qualities required in coatings, the coating color must flow smoothly and evenly so that it can be applied to the cellulosic web at sufficiently high speeds to be economical in ordinary coating processes; and the coating must have high strength, to permit subsequent printing on the coated paper without "picking," i.e. it must have good "pick" characteristics.

It is, accordingly, an object of this invention to provide an improved coating composition for the preparation of coated webs having the above-described desirable surface characteristics.

In accordance with the present invention, there is provided a coating composition containing an adhesive or binder comprising a vinyl acetate-ethylene copolymer latex, together with clay and the usual paper coating additives, which may include minor amounts of other adhesives or binders, such as polyvinyl alcohol, casein, or starch. The individual components of the composition, other than the vinyl acetate-ethylene copolymer latex, are well-known materials and articles of commerce. The combination of these materials, in the relationships described below, provides a coating material having many desirable characteristics and advantages.

The vinyl acetate-ethylene copolymer latices which are used in accordance with this invention have, as produced, a relatively high solids contents, e.g. solids content of 45 to 60%. They can, of course, be easily thinned by the addition of water to lower solids contents of any desired value. Similarly the copolymers can have a relatively high ethylene content, e.g. above 15%, although lower amounts can also be present. In general, the copolymers have an ethylene content of 5 to 40%. The latices also contain relatively high molecular weight vinyl acetate-ethylene copolymers. Typically the copolymers in the latices used in accordance with this invention have intrinsic viscosity values of 1 to 2.5 deciliters/g. as measured in benzene at 30° C., which is indicative of relatively high molecular weights. In addition, the latices have a relatively small average particle size, i.e. below $0.25\mu$, preferably below $0.15\mu$.

To prepare the vinyl acetate-ethylene copolymer latices for preparing the paper coating compositions of this invention, vinyl acetate and ethylene are copolymerized in an aqueous medium under pressures not exceeding 100 atmospheres in the presence of a catalyst and at least one emulsifying agent, the aqueous system being maintained, by a suitable buffering agent, at a pH of 2 to 6. The process is a batch process which involves first a homogenization period in which the vinyl acetate suspended in water is thoroughly agitated in the presence of ethylene under the working pressure to effect solution of the ethylene in the vinyl acetate up to the substantial limit of its solubility under the conditions existing in the reaction zone, while the vinyl acetate is gradually heated to polymerization temperature. The homogenization period is followed by a polymerization period during which the catalyst, which consists of a main catalyst or initiator, and may include an activator, is added incrementally, the pressure in the system being maintained substantially constant by application of a constant ethylene pressure.

Various free-radical forming catalysts can be used in carrying out the polymerization of the monomers, such as peroxide compounds. Also suitable as catalysts are the combination type catalysts employing both reducing agents and oxidizing agents. The use of this type of combined catalyst is generally referred to in the art as "redox polymerization" or "redox system." The reducing agent is often referred to as an activator and the oxidizing agent as an initiator. Suitable reducing agents or activators include bisulfites, sulfoxylates, or other compounds having reducing properties such as ferrous salts, and tertiary aromatic amines, e.g. N,N-dimethyl anilines. The oxidizing agents or initiators include hydrogen peroxide, organic peroxides such as benzoyl peroxide, t-butyl hydroperoxide and the like, persulfates, such as ammonium or potassium persulfate, perborates, and the like. Specific combination type catalysts or redox systems which can be used include hydrogen peroxide and zinc formaldehyde sulfoxylate; hydrogen peroxide, ammonium persulfate, or potassium persulfate, with sodium metabisulfite, sodium bisulfite, ferrous sulfate, dimethylaniline, zinc formaldehyde sulfoxylate or sodium formaldehyde sulfoxylate. It is advantageous to utilize the more water-soluble peroxides, such as hydrogen peroxide, rather than the more oil-soluble peroxides such as t-butyl hydroperoxide, in the redox system, to catalyze the monomer polymerization. Redox catalyst systems are described, for example, in "Fundamental Principles of Polymerization," by G. F. D'Alelio (John Wiley and Sons, Inc., New York, 1952) pp. 333 et esq. Other types of catalysts that are well-known in the art can also be used to polymerize the monomers, with or without the addition of reducing agents or other activating materials.

The catalyst is employed in the amount of 0.1 to 2% preferably 0.25 to 0.75%, based on the weight of vinyl acetate introduced into the system. The activator is ordinarily added in aqueous solution and the amount of activator is generally 0.25 to 1 times the amount of catalyst.

The emulsifying agents which are suitably used are non-ionic. Suitable non-ionic emulsifying agents include polyoxyethylene condensates. Polyoxyethylene condensates may be represented by the general formula

where R is the residue of a fatty alcohol containing 10–18 carbon atoms, an alkyl phenol, a fatty acid containing 10–18 carbon atoms, an amide, an amine, or a mercaptan, and where $n$ is an integer of 1 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thio-ethers such as polyoxyethylene n-dodecyl thio-ether.

The non-ionic emulsifying agents which can be used also include a series of surface active agents known as "Pluronics." The "Pluronics" have the general formula:

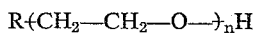

where $a$, $b$, and $c$ are integers of 1 or above. As $b$ increases, the compounds become less water soluble or more oil soluble and thus more hydrophobic when $a$ and $c$ remain substantially constant.

In addition, highly suitable are a series of ethylene oxide adducts of acetyleneic glycols sold commercially under the name "Surfynols." This class of compounds can be represented by the formula

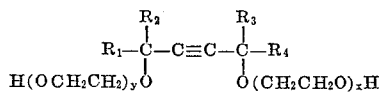

in which $R_1$ and $R_4$ are alkyl radicals containing from 3 to 10 carbon atoms, $R_2$ and $R_3$ are selected from the group consisting of methyl and ethyl, $x$ and $y$ have a sum in the range of 3 to 60, inclusive.

Some examples of non-ionic emulsifying agents which can be used are as follows:

A polyoxyethylene nonylphenyl ether having a cloud point of between 126 and 135° F. is marketed under the trade name "Igepal CO–630" and a polyoxyethylene nonylphenyl ether having a cloud point above 212° F. is marketed under the trade name "Igepal CO–887." A similar polyoxyethylene nonylphenyl ether having a cloud point of about 06° F. is marketed under the trade name "Igepal CO–610." A polyoxyethylene octylphenyl ether having a could point of between 80° F. and 160° F. is marketed under the trade name "Triton X–100."

A polyoxyethylene oleyl ether having a cloud point of between 80° F. and 160° F. is marketed under the trade name "Atlas G–3915" and a polyoxyethylene lauryl ether having a cloud point above 190° F. is marketed under the trade name "Brij 35."

A polyoxypropylene having a cloud point of about 140° F. is marketed under the trade name "Pluronic L–64," and a polyoxypropylene having a cloud point of about 212° F. is marketed under the trade name "Pluronic F–68." "Pluronic L–64" is a polyoxyethylene-polyoxypropylene glycol conforming to the above general formula for "Pluronics" in which the polyoxypropylene chain has a molecular weight of 1500 to 1800 and the polyoxyethylene content is from 40 to 50 percent of the total weight of the molecule. "Pluronic F–68" is a polyoxyethylene-polyoxypropylene glycol conforming to the above general formula for "Pluronics" in which the polyoxypropylene chain has a molecular weight of 1500 to 1800 and the polyoxyethylene content is from 80 to 90 percent of the total weight of the molecule. The polyoxypropylene "Pluronics" are obtained by condensing ethylene oxide on the polyoxylpropylene base and the hydrophobicy-hydrophilic nature of the resulting compound is controlled by varying the molecular weight of either the hydrophobic base or the hydrophilic portion of the molecule.

Representative of the "Surfynols" are "Surfynol 465" which is an ethylene oxide adduct of 2,4,7,9-tetramethyl decynediol containing an average of 10 moles of ethylene oxide per mole, and "Surfynol 485" which corresponds to "Surfynol 465," but contains an average of 30 moles of ethylene oxide per mole. "Surfynol 465" has a cloud point of about 145° F. and "Surfynol 485" has a cloud point above 212° F.

In the foregoing, cloud points recited are based on 1% aqueous solutions. A single emulsifying agent can be used, or the emulsifying agents can be used in combination. When combinations of emulsifying agents are used, it is advantageous to use a relatively hydrophobic emulsifying agent in combination with a relatively hydrophilic agent. A relatively hydrophobic agent is one having a cloud point in 1% aqueous solution below 190 F. and a relatively hydrophilic agent is one having a cloud point in 1% aqueous solution of 190° F. or above.

The concentration range of the total amount of emulsifying agents useful is from about 2 to 5% based on the aqueous phase of the latex regardless of the solids content. Latex stabilizers are also advantageous used. An ethylenically-unsaturated acid having up to 6 carbon atoms, is advantageously used as the stabilizer. Ttypical acids of this character are acrylic acid, methacrylic acid, itaconic acid, maleic acid, vinyl sulfonic acid and the like. These unsaturated acids impart stability to the latices over a wide pH range. They tend to copolymerize with the monomers in the system. The amount of unsaturated acid used is suitably 0.1 to 3% based on vinyl acetate, preferably 0.2 to 1%.

In order to maintain the pH of the system at the desired value, there is suitably added an alkaline buffering agent of any convenient type. Any alkaline material which is compatible with the stabilizing agent can be used as the buffer. The amount of buffer is that sufficient to adjust the pH of the system within the desired range. Ammonium and sodium bicarbonate are preferred buffer because of their compatibility with the system and their low cost. The amount of buffer is generally about 0.1 to 0.5% by weight, based on the monomers. Other buffers such as disodium phosphate, sodium acetate, and the like, can, however, also be used.

The reaction temperature can be controlled by the rate of catalyst addition and by the rate of the heat dissipation therefrom. Generally it is advantageous to maintain a mean temperature of about 50° C. during the polymerization of the monomers and to avoid temperatures much in excess of 80° C., while temperatures as low as 0° can be used, economically the lower temperature limit is about 30° C.

The reaction time will also vary depending upon other variables such as the temperature, the catalyst, and the desired extent of the polymerization. It is generally desirable to continue the reaction until less than 0.5% of the vinyl acetate remains unreacted. Under these circumstances, a reaction time of about 6 hours has been found to be generally sufficient for complete polymerization, but reaction times ranging from 3 to 10 hours have been used, and other reaction times can be employed, if desired.

In carrying out the polymerization, a substantial amount of the vinyl acetate is initially charged to the polymerization vessel and saturated with ethylene in the manner discussed above. Most advantageously, at least about 75% of the total vinyl acetate to be polymerized is initially charged, preferably at least about 85%, and the remainder of the vinyl acetate is incrementally added during the course of the polymerization. However, all of the vinyl acetate can be charged initially, with no additional incremental supply. When reference is made to incremental addition, whether of vinyl acetate, catalyst, or activator, substantially uniform additions, both with respect to quantity and time, are contemplated.

The quantity of ethylene entering into the copolymer is influenced by the pressure, the agitation, and the viscosity of the polymerization medium. Thus, to increase the ethylene content of the copolymer, higher pressures are employed, but even to introduce 40% or more of ethylene into the copolymer, pressures in excess of 100 atms. are not required. However, a pressure of at least about 10 atms. is most suitably employed. Similarly, when high ethylene contents are desired, a high degree of agitation should be employed, and high viscosities should be avoided, a low viscosity being preferred. When referring to viscosities, a viscosity of 30 to 150 centipoises is considered a low viscosity, a viscosity of 151 to 800 centipoises is considered a medium viscosity, and a viscosity of 801 to 3000 centipoises is considered a high viscosity.

The process of forming the vinyl acetate-ethylene copolymer latices generally comprises the preparation of an aqueous solution containing at least some of the emulsifying agent and stabilizer, and the pH buffering system. This aqueous solution and the initial charge of vinyl acetate are added to the polymerization vessel and ethylene pressure is applied to the desired value. As previously mentioned, the mixture is thoroughly agitated to dissolve ethylene in the vinyl acetate and in the water phase, agitation being continued until substantial equilibrium is achieved. This generally requires about 15 minutes. However, less time may be required depending upon the vessel, the efficiency of agitation, the specific system, and the like. In any case, by measuring the pressure drop of the ethylene in conventional manner, the realization of substantial equilibrium can be easily determined. Conveniently the charge is brought to polymerization temperature during this agitation period. Agitation can be effected by shaking, by means of an agitator, or other known mechanism. The polymerization is then initiated by introducing initial amounts of the catalyst, and of the activator when used. After polymerization has started, the catalyst and the activator are incrementally added as required to continue polymerization, and the remaining vinyl acetate, if any, is similarly added.

As mentioned, the reaction is generally continued until the residual vinyl acetate content is below 0.5%. The completed reaction product is then allowed to cool to about room temperature, while sealed from the atmosphere. The pH is then suitably adjusted to a value in the range of 4.5 to 7, preferably 6 to 6.5 to insure maximum stability.

The particle size of the latex can be regulated by the quantity of non-ionic emulsifying agent or agents employed. Thus, to obtain smaller particle sizes, greater amounts of emulsifying agent are used. As a general rule, the greater the amount of the emulsifying agent employed, the smaller the average particle size. It will be understood that in each case, the quantity and size values referred to above are all within the limits of values previously specified in the foregoing description.

The clay employed in making the paper coating composition with the vinyl acetate-ethylene copolymer latex is conventional coating clay and is used in conventional manner in the form of a "slip," i.e. dispersed in water to a suitable solids content, e.g. about 65%.

The present invention permits the use of any of the clays customarily used for coating paper, including the hydrous aluminum silicates of kaoline group clays, hydrated silica clays, and the specific types of clays recommended in "Kaolin Clays and Their Industrial Uses," copyright 1949 by J. M. Huber Corp., New York, N.Y., particularly in chapters 10–16.

In addition to clay itself, there may be utilized other paper filling compositions and materials such as, for example, calcium sulfate, titanium dioxide, blanc fixe, lithopone, zinc sulfide, zinc oxide, or other coating pigments in various ratios, e.g. up to 50% by weight of the clay. As previously indicated, the slip may also contain a small amount, e.g. 0.01 to 0.50%, of a dispersing or stabilizing agent such as tetrasodium pyrophosphate. The modification of the coating color using these materials will be within the knowledge of those skilled in the art.

As previously mentioned, the paper coating compositions may also contain polyvinyl alcohol or other like adhesive or binder. Polyvinyl alcohol is commonly produced by the hydrolysis of polyvinyl acetate. The hydrolysis—more correctly "alcoholysis"—can be carried to any degree of completion, resulting in polyvinyl alcohol of several different degrees of hydrolysis or grades. The percentage hydrolysis indicates the percentage of the original acetate groups that have been replaced by —OH groups. Arbitrarily, any polyvinyl acetate which, is more than 50% hydrolyzed is termed polyvinyl alcohol.

Starting from pure polyvinyl acetate, as the number of —OH groups increases, marked property changes occur. For example, the water solubility characteristics are greatly affected. The —OH groups have the initial effect of making the product more water sensitive, but then as they increase in number, and can, therefore, readily form intermolecular hydrogen bonds, the polymer becomes insoluble in cold water and can be dissolved only in hot water. At the same time, the increased ability to form hydrogen bonds produces greater cohesive as well as adhesive strength. In addition, as the number of —OH groups increases, resistance to organic solvents steadily increases. Whereas polyvinyl acetate is readily dissolved by organic solvents, fully hydrolyzed polyvinyl alcohol is totally unaffected by all but a few particular solvents. Hence, in general, the higher hydrolyzed grades will have the greatest water and organic solvent resistance and the best strength characteristics.

The molecular chain length of the polyvinyl alcohol also affects properties. The most outstanding effect is that as molecular weight increases the viscosity of solutions of polyvinyl alcohol increases. Water resistance also, is notably greater in the higher viscosity types. The degree of polymerization of the higher viscosity types is in the range 1500–3000 and of the lower viscosity types, 200–1000.

Somewhat like starch, concentrated solutions of the highly hydrolyzed grades of polyvinyl alcohol tend to thicken and gel on standing. All molecular weight grades display this property. The gels are readily broken by heating but reform again on cooling. Polyvinyl alcohol that is less than 99% hydrolyzed is essentially free of this gelling tendency.

The percent hydrolysis of the polyvinyl alcohol suitable for use in accordance with this invention can vary from about 55 percent to 100 percent. Polyvinyl alcohol polymers having a viscosity between about 2 and 150 centipoises in a 4 percent solution at 20° C. are suitable for this application. However, studies have shown that for best coating color work the polyvinyl alcohol should be highly hydrolyzed and should be of the medium viscosity type, viz. having a viscosity of 20–40 centipoises. The higher the degree of hydrolysis the greater is the pick strength and the water resistance of the finished coating. The medium viscosity type of polyvinyl alcohol provides pick strength that is greater than that achievable with the low viscosity types but essentially equivalent to that of the high viscosity types. Since it allows for the preparation of colors with high solids, the medium viscosity type is preferred.

Especially suitable for use in the coating compositions of the present invention is polyvinyl alcohol which has an extremely high degree of hydrolysis. Such materials are known in the art as "super-hydrolyzed" polyvinyl alcohol resin of fully hydrolyzed polyvinyl alcohol resin. The super grade may have a degree of hydrolysis of 99.7 percent or higher, and the fully hydrolyzed grade may have a percent hydrolysis of 99+ percent or higher. Such material is sold under a variety of trade names. Among the commercially available super-hydrolyzed grades may be mentioned Vinol 125 produced by Air Reduction Company, Incorporated. Among examples of fully hydrolyzed polyvinyl alcohol having a percent hydrolysis of 99+ percent may be mentioned Vinol 260, Vinol 230 and Vinol 205, produced by Air Reduction Company, Incorporated. Other polyvinyl alcohols having a percent hydrolysis between about 97 percent and 98 percent and sold under the trade names Vinol 350 and Vinol 355 by the same company are also especially suitable.

The super-hydrolyzed and fully hydrolyzed grades of polyvinyl alcohol have the advantage that films produced therefrom are extremely resistant to attack by cold water. The resistance of films produced from hydrolyzed water-soluble polyvinyl alcohol to cold water attack apparently reaches a maximum when the degree of hydrolysis of the polyvinyl alcohol is at a maximum.

The coating compositions, i.e. the "colors" of this invention can be prepared by any of several techniques. The usual method involves merely combining the vinyl acetate-ethylene copolymer latex. When polyvinyl alcohol is also used, the most convenient method involves separately dissolving the polyvinyl alcohol in water and then combining the resulting solution and the vinyl acetate-ethylene copolymer latex, with the pigment slip.

Polyvinyl alcohol solutions are made by adding the dry polyvinyl alcohol to well agitated water. The use of warm water accelerates the overall preparation time. Some commercial products must, however, be added to cold water or lumping will occur. The temperature should then be brought to 200° F. and retained there for 20 to 30 min. This dissolving procedure is suitable for both the super-hydrolyzed grade and the fully hydrolyzed grade. The latter, however, being less water resistant, will dissolve somewhat faster.

While it is still warm the polyvinyl alcohol solution is combined with the clay slip. Pigment "shock" can sometimes occur while preparing colors. The employment of the lowest practicable solids polyvinyl alcohol solution, the combination of slip and solution while the latter is quite hot, the addition of the slip to the polyvinyl alcohol solution (rather than the reverse order of addition), and the addition of a small amount of tetrasodium pyrophosphate to the polyvinyl alcohol solution—although not necessary procedures—all tend to minimize the possibility of shock. The addition of surfactants to the polyvinyl alcohol solution is the preferred method for eliminating shock. Surfactants that also perform as defoamers can be employed. Typical defoaming agents include tributyl phosphate, pine oil, and symmetrical ditertiary acetylenic glycols sold under the trade name "Surfynol 104A,"

The relative proportions of the several components of the coating composition of this invention may vary to suit individual requirements, but in all cases the vinyl acetate-ethylene copolymer latex is present in an amount greater than the total amount of other binders, based on the solids contents of the binder solutions or latices, and in general, the composition has the following relative relationships, per 100 parts of filler, all parts being by weight:

| | Parts | |
|---|---|---|
| Clay | 80 to 100 | Total 100. |
| Secondary filler, e.g. titanium dioxide | 0 to 35 | |
| Dispersing agent | 0.01 to 0.5. | |
| Vinyl acetate-ethylene copolymer latex (solids basis) | 5 to 25. | |
| Other binders, e.g. polyvinyl alcohol (solids basis) | 0 to 25. | |
| Defoamer (anti-shock agent) | 0 to 0.2. | |

Water—sufficient to provide solids content of 35 to 70 percent.

For optimum results in the coating of paper or paperboard, it is preferred to prepare a coating color having a total solids composition which is relatively high, thus providing good surface coating qualities and economical operation. A preferred range of total solids for the coating color is between about 40 and 60 percent solids with an optimum value at about 45 to 55 percent. A composition containing an amount of total solids and binder in the ranges specified is characterized by being readily applied to the surface of the paper and by forming a highly resistant coating thereon. Thus, utilizing the coating color according to this invention, there is produced a clay-coated paper which is highly satisfactory for use in printing operations and is resistant to disturbance of the clay-coating surface through rubbing, picking, and the like.

The particular combination of components described above, including the vinyl acetate-ethylene copolymer latex, is significant in that it can be effectively used both in a neutral or slightly alkaline environment, e.g. up to pH 8, produces a coating which is characterized by excellent gloss, brightness, pick properties, finish, opacity and grease resistance, as well as water resistance. This highly desirable combination of characteristics is obtained with the coating composition of this invention while maintaining the total binder level at a relatively low value in comparison with conventional practice. Not only is this an important factor from an economic standpoint, but it insures increased opacity in the coating.

The improved coating composition of this invention is applied to the fibrous web to be coated by any convenient means. Preferably, however, it is applied by means of a coating device of the type known in the art as a trailing blade coater, in which a pool of the coating composition is maintained in the bight between a backing roll around which the paper travels, and a flexible blade, one end of which extends close to the paper on the backing roll and meters the flow of the coating composition to the paper. A particularly suitable device is known in the industry as a Champion coater, in which a reverse running furnish roll supplies excess color to the web, and a driven, reverse running rod doctors and smooths the color. What is unique about these installations is the fact that they are almost invariably found far back in the machine, close to the wet end; hence, many hot can driers come in direct contact with the coating after it is applied. The coating can be applied at one time or a plurality of times. In practice, two coaters are used with driers between them. Typically about twenty steam cans follow the first coater and about forty more follow the second coating station. The Champions are so located because at these points the web is still wet and flexible, hence better wiping action is achieved at the smoothing rod. With the steam can drying it has been found that the coatings could be cured to a very high degree of water resistance, wet rub and wet pick resistance, As previously mentioned, the invention is in no way restricted to Champion coaters. The coating composition performs well on roll coaters, air knife coaters and on blade coaters, and in the latter cases speeds in excess of 2000 f.p.m. are involved. Also, other types of drying systems are suitable.

The invention will now be more specifically illustrated by reference to the following examples of practical application, it being understood that these examples are given for illustrative purposes only and are not limitative of the invention.

EXAMPLE 1

The following was charged to a 25-gal. stainless steel pressure reactor equipped with temerature controls and an agitator:

| | G. |
|---|---|
| Water | 20,000 |
| Igepal 887 | 680 |
| Igepal 630 | 340 |
| Sodium salt of vinyl sulfonic acid | 128 |
| Sodium lauryl sulfate | 38 |
| Citric acid | 56 |
| Disodium phosphate hydrate | 24 |
| Vinyl acetate | 22,600 |

The reactor was then purged with nitrogen and ethylene to remove all oxygen, after which 300 g. of potassium persulfate were added. The charge was heated to 50° C. During the heat-up period ethylene was added to a pressure of 36 atm. and the agitator set at 230 r.p.m. The equilibrium of ethylene between the vapor pocket and dissolved in the vinyl acetate was reached within 15 min. as indicated by the stoppage of ethylene flow from the supply cylinder to the reactor. Polymerization was then started by adding 25 g. of a 4% Formopon (sodium formaldehyde sulfoxylate) solution. The polymerization was completed after 4½ hr. at which time 1,500 g. of 4% Formopon solution had been used and an additional 10 g. potassium persulfate had been added. The latex was cooled to room temperature and neutralized to pH=6 with ammonia. A vinyl acetate-ethylene copolymer latex was obtained with the following properties:

48% solids
19% ethylene in copolymer
Intrinsic viscosity=2.1 (100 ml./g., benzene 30° C.)
Particle size =0.21$\mu$
$T_{135}$=0° C.
$T_4$=+6° C.

$T_{135}$ is the temperature at which the torsional modulus is 135,000 lbs./in.$^2$, and $T_4$ the temperature at which the torsional modulus is 10,000 lbs./in.$^2$ determined according to ASTM–D1043–61T. The ethylene content can be determined by means of the saponification number.

Intrinsic viscosity is suitably determined by convention techniques, e.g. in accordance with the procedure described on pages 309–314 of "Principles of Polymer Chemistry," by Paul J. Flory (Cornell University Press—1963), using an Ubbelohde (suspended level) Viscometer at 30° C.

As will be seen from the foregoing example, the unsaturated acid previously mentioned in the discussion of stabilizers can be employed in the form of a salt, e.g. the sodium salt. Similarly, a small amount, e.g. up to 0.5% based on the latex, of an anionic surfactant can be present. The anionic surfactant can be of any known type, such as disclosed, for example, in chapter 2 of "Surface Active Agents and Detergents," by A. M. Schwartz, J. S. Perry and J. Berch (vol. 2, 1958, Interscience Publishers, New York). A particularly suitable anionic surfactant is sodium lauryl sulfate, used in the foregoing Example 1.

EXAMPLE 2

The latex produced in Example 1 was compounded, in conventional manner, with a filler and a dispersing agent to provide a paper-coating formulation having the following composition and characteristics:

Predisposed HT clay—100 parts
Tetrasodium pyrophosphate—0.05 part
Latex of Example 1–16 parts (calculated as 100% solids)
Water—sufficient to provide 50% total solids The formulation had a pH of 6.6 and a viscosity at room temperature of 40 centipoises (50 r.p.m.).

The compounding and application techniques which are suitably employed in making and using the paper coatings or "colors" using a vinyl acetate-ethylene copolymer latex, in accordance with the invention, are conventional and form no part of the invention. Typical procedures are described for example in "The Technology of Coated and Process Papers," by Robert H. Mosher (Chemical Publishing Company, Inc., New York, 1952), Chapter IV (water-soluble coatings) and Chapter VI (water-dispersion coatings).

Thus, the above characterized coating color was applied to the wire side of several sheets of a 49 lb. offset rawstock to a final coat weight of 10–11 lb. of dry coating per 3300 square feet of surface area. The sheets were dried at 195° F. for about 35 seconds, conditioned at 73° F. and 50% relative humidity overnight, and supercalendered by two passes at 130° F. and 3 p.s.i. The sheets were allowed to recondition overnight and were then tested. The following highly satisfactory results were obtained:

| | |
|---|---|
| 45° brightness | 78.2 |
| 75° gloss | 56.8 |
| K and N Ink Receptivity | 53 |
| Dennison Wax Pick | 7 |
| IGT Pick, f.p.m. | 214 |

The brightness was measured at 45° in accordance with Tappi Standard T452 m–48. The gloss was measured in accordance with Tappi Standard T480 m–51. The Dennison Wax Pick value was obtained by the standard Dennison wax test to provide a numerical indication of the effectiveness of the coating color, particularly with respect to its printing qualities. The Dennison wax test is Tappi standard T459 m–48. The IGT pick value was similarly obtained by the standard IGT pick test using an IGT Dynamic Pick Tester, No. 5 ink, a "B" spring setting, and a 50 kg. load being used in Examples 1–5. The K and N Ink Receptivity value similarly is determined by standard test which involves the application of a standard ink, allowing the ink to remain for a specified period of time, and then measuring with a photovoltmeter.

When the foregoing evaluation was repeated in identical manner except that a conventional styrene-butadiene latex of about 48% solids content was substituted for the vinyl acetate-ethylene latex, generally similar brightness and gloss results were obtained but the K and N Ink Receptivity was lower, the Dennison Wax Pick value was only 5, and the IGT Pick value was less than 100.

EXAMPLE 3

A coating color was prepared by conventional means, as in Example 2, to provide the following composition:

Predisposed HT (kaolinite) clay—100 parts
Tetrasodium pyrophosphate—0.05 part
Latex of Example 1–6 parts (calculated as 100% solids)
Stayco "C" starch—18 parts
Water—sufficient to provide 50% total solids The formulation had a pH of 6.3 and a viscosity at room temperature of 740 centipoises (50 r.p.m.).

This coating color was applied to 49 lb. offset rawstock exactly as described in Example 2, and the finished sheets were tested to give the following results:

| | |
|---|---|
| 45° brightness | 76.5 |
| 75° gloss | 36.7 |
| K and N Ink Receptivity | 63 |
| Dennison Wax Pick | 8 |
| IGT Pick, f.p.m. | 192 |

EXAMPLE 4

Repeating Example 3, but using casein in place of starch, the following composition was prepared:

Predispersed HT clay—100 parts
Tetrasodium pyrophosphate—0.05 part
Casein—10 parts
Ammonium hydroxide 28%—1.5 parts
Latex of Example 1—6 parts (calculated as 100% solids)
Water—sufficient to provide 50% total solids The formulation had a pH of 9.3 and a viscosity at room temperature of 2000 centipoises (50 r.p.m.).

When tested as described in Examples 2 and 3, the following results were observed:

| | |
|---|---|
| 45° brightness | 78.6 |
| 75° gloss | 41.8 |
| K and N Ink Receptivity | 53 |
| Dennison Wax Pick | 9 |
| IGT Pick, f.p.m. | 202 |

EXAMPLE 5

Again repeating Example 3, but using polyvinyl alcohol instead of starch, the following coating color was prepared:

Predispersed HT clay—100 parts
Tetrasodium pyrophosphate—0.05 part
Vinol 125—5 parts
Latex of Example 1-6 parts (calculated as 100% solids)
Water—sufficient to provide 50% solids This formulation had a pH of 6.5 and a viscosity at room temperature of 680 centipoises (50 r.p.m.).

The testing procedure described in Example 2 was repeated, with the following results:

| | |
|---|---|
| 45° brightness | 79 |
| 75° gloss | 50.7 |
| K and N Ink Receptivity | 53 |
| Dennison Wax Pick | 8 |
| IGT Pick, f.p.m. | 208 |

It will thus be seen that the invention provides a highly effective and efficient paper coating composition. It will be apparent that various changes and modifications may be made in the embodiments of the invention described above, without departing from the scope of the invention, as defined in the appended claims, and it is intended, therefore, that all matter contained in the foregoing description shall be interpreted as illustrative only and not as limitative of the invention.

We claim:

1. An aqueous coating composition for application to a fibrous web to provide said web with a bright, glossy coating having desirable pick characteristics, said composition comprising a synthetic polymer latex and a paper coating mineral filler, said synthetic polymer latex comprising an aqueous medium having dispersed therein said mineral filler and a vinyl acetate-ethylene copolymer containing 5 to 40% ethylene in the copolymer, said copolymer being further characterized by an intrinsic viscosity of 1 to 2.5 deciliters per gram as measured in benzene at 30° C., and said dispersed copolymer having a particle size of $0.1\mu$ to $0.25\mu$.

2. An aqueous coating composition as defined in claim 1 wherein said composition has a solids content of 35 to 70% and said latex is present, on a latex solids basis, in the amount of 5 to 25 parts by weight per 100 parts of said filler.

3. A fibrous web coated with a solid bright, glossy coating having desirable pick characteristics, said coating being that deposited upon the evaporation of water from an aqueous coating composition applied to said web and comprising a synthetic polymer latex and a paper coating mineral filler, said synthetic polymer latex comprising an aqueous medium having dispersed therein said mineral filler and a vinyl acetate-ethylene copolymer containing 5 to 40% ethylene in the copolymer, said copolymer being further characterized by an intrinsic viscosity of 1 to 2.5 deciliters per grams as measured in benzene at 30° C., and said dispersed copolymer having a particle size of $0.1\mu$ to $0.25\mu$.

4. A fibrous web as defined in claim 3 wherein said composition has a solids content of 35 to 70% and said latex is present, on a latex solids basis, in the amount of 5 to 25 parts by weight per 100 parts of said filler.

5. A method of providing a fibrous web with a bright, glossy coating characterized by desirable pick characteristics which comprises applying to said web an aqueous coating composition comprising a synthetic polymer latex and a paper coating mineral filler, said synthetic polymer latex comprising an aqueous medium having dispersed therein said mineral filler and a vinyl acetate-ethylene copolymer containing 5 to 40% ethylene in the copolymer, said copolymer being further characterized by an intrinsic viscosity of 1 to 2.5 deciliters per gram as measured in benzene at 30° C., and said dispersed copolymer having a particle size of $0.1\mu$ to $0.25\mu$.

6. A method as defined in claim 5 wherein said composition has a solids content of 35 to 70% and said latex is present, on a latex solids basis, in the amount of 5 to 25 parts by weight per 100 parts of said filler.

7. A coating composition as defined in claim 1 wherein said copolymer contains more than 15% ethylene.

8. A fibrous web as defined in claim 3 wherein said copolymer contains more than 15% ethylene.

9. A method as defined in claim 5 wherein said copolymer contains more than 15% ethylene.

10. A coating composition for paper comprising an aqueous mixture containing 100 weight parts pigment and 5 to 25 weight parts of a binder comprising a copolymer of 5 to 40 weight percent ethylene, 95 to 60 weight percent vinyl acetate, and 0 to 3 weight percent of an ethylenically unsaturated acid selected from the class consisting of acrylic, methacrylic, and maleic acids.

11. A coating composition as claimed in claim 10, wherein said copolymer comprises at least ⅙ of said binder and at least one member selected from the class consisting of casein, starch, and polyvinyl alcohol comprises up to ⅚ of said binder.

12. A coating composition claimed in claim 10, wherein said aqueous mixture comprises 35 to 70% solids.

13. Composition claimed in claim 10, wherein said acid is maleic acid.

14. Composition claimed in claim 10, wherein said member is casein and said acid is maleic acid.

15. Paper coated with the composition claimed in claim 10.

References Cited

UNITED STATES PATENTS

| | | | |
|---|---|---|---|
| 3,296,170 | 1/1967 | Burkhart et al. | 260—29.602 |
| 3,337,482 | 8/1967 | Watanabe et al. | 260—29.6 EMM |

MURRAY TILLMAN, Primary Examiner

H. W. ROBERTS, Assistant Examiner

U.S. Cl. X.R.

117—155 UA, 161 U2, UT; 260—17.4 ST, 29.6 R, TA, WA, 41 A, B